(12) United States Patent
Erkek et al.

(10) Patent No.: US 10,444,765 B2
(45) Date of Patent: Oct. 15, 2019

(54) VEHICLE THAT MOVES AUTOMATICALLY WITHIN AN ENVIRONMENT AS WELL AS A SYSTEM WITH A VEHICLE AND AN EXTERNAL ILLUMINATING DEVICE

(71) Applicant: Vorwerk & Co. Interholding GmbH, Wuppertal (DE)

(72) Inventors: David Erkek, Aarau (CH); Georg Hackert, Bochum (DE); Gerhard Isenberg, Cologne (DE); Roman Ortmann, Huerth (DE); Andreas Schmidt, Mettmann (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 0 days.

(21) Appl. No.: 16/002,251

(22) Filed: Jun. 7, 2018

(65) Prior Publication Data
US 2018/0356834 A1 Dec. 13, 2018

(30) Foreign Application Priority Data
Jun. 9, 2017 (DE) .................. 10 2017 112 793

(51) Int. Cl.
*G05D 1/02* (2006.01)
*A47L 9/00* (2006.01)
*B25J 9/16* (2006.01)
*B25J 11/00* (2006.01)
*G05D 1/00* (2006.01)
(Continued)

(52) U.S. Cl.
CPC ............ *G05D 1/0274* (2013.01); *A47L 9/009* (2013.01); *A47L 9/2805* (2013.01); *B25J 9/1666* (2013.01); *B25J 11/0085* (2013.01); *G05D 1/0088* (2013.01); *G05D 1/0231* (2013.01); *G05D 1/0285* (2013.01); *H05B 37/0227* (2013.01); *H05B 37/0272* (2013.01); *A47L 2201/04* (2013.01); *G05B 15/02* (2013.01); *G05D 2201/0215* (2013.01); *Y10S 901/01* (2013.01); *Y10S 901/09* (2013.01)

(58) Field of Classification Search
CPC ............... G05D 1/0274; G05D 1/0231; G05D 2201/0215; G05D 1/0088; G05D 1/0285; B25J 9/1666; B25J 11/0085; H05B 37/0227; H05B 37/0272; Y10S 901/01; Y10S 901/09; G05B 15/02; A47L 2201/04; A47L 9/009; A47L 9/2805
See application file for complete search history.

(56) References Cited

U.S. PATENT DOCUMENTS 9,179,526 B2 * 11/2015 Pedersen ............ H05B 37/0272
9,274,525 B1 * 3/2016 Ferguson ............. G05D 1/0274
(Continued)

*Primary Examiner* — Frederick M Brushaber
(74) *Attorney, Agent, or Firm* — Collard & Roe, P.C.

(57) ABSTRACT

An unmanned vehicle that moves automatically within an environment, in particular a cleaning robot, with a detection system for detecting object data in an environment of the vehicle and a calculating device for generating an area map based on recorded object data. The area map has information about a position of an external illuminating device designed separately from the vehicle, as well as one or several items of information about the illuminating device, such as light intensity, emission spectrum, position and/or size of a partial area of an environment that can be illuminated by the illuminating device, and type of illuminating device.

9 Claims, 4 Drawing Sheets

(51) Int. Cl.
*H05B 37/02* (2006.01)
*A47L 9/28* (2006.01)
*G05B 15/02* (2006.01)

(56) References Cited

U.S. PATENT DOCUMENTS

| | | | |
|---|---|---|---|
| 2006/0237634 A1* | 10/2006 | Kim | G01S 7/495 |
| | | | 250/221 |
| 2010/0152944 A1* | 6/2010 | Kouno | G05D 1/024 |
| | | | 701/26 |
| 2013/0009569 A1* | 1/2013 | Knibbe | H05B 37/0227 |
| | | | 315/297 |
| 2013/0056032 A1* | 3/2013 | Choe | A47L 9/0488 |
| | | | 134/18 |
| 2016/0144505 A1* | 5/2016 | Fong | B25J 9/1602 |
| | | | 700/250 |
| 2016/0147230 A1* | 5/2016 | Munich | G05D 1/0246 |
| | | | 701/28 |
| 2018/0125003 A1* | 5/2018 | Wu | A01D 34/00 |

\* cited by examiner

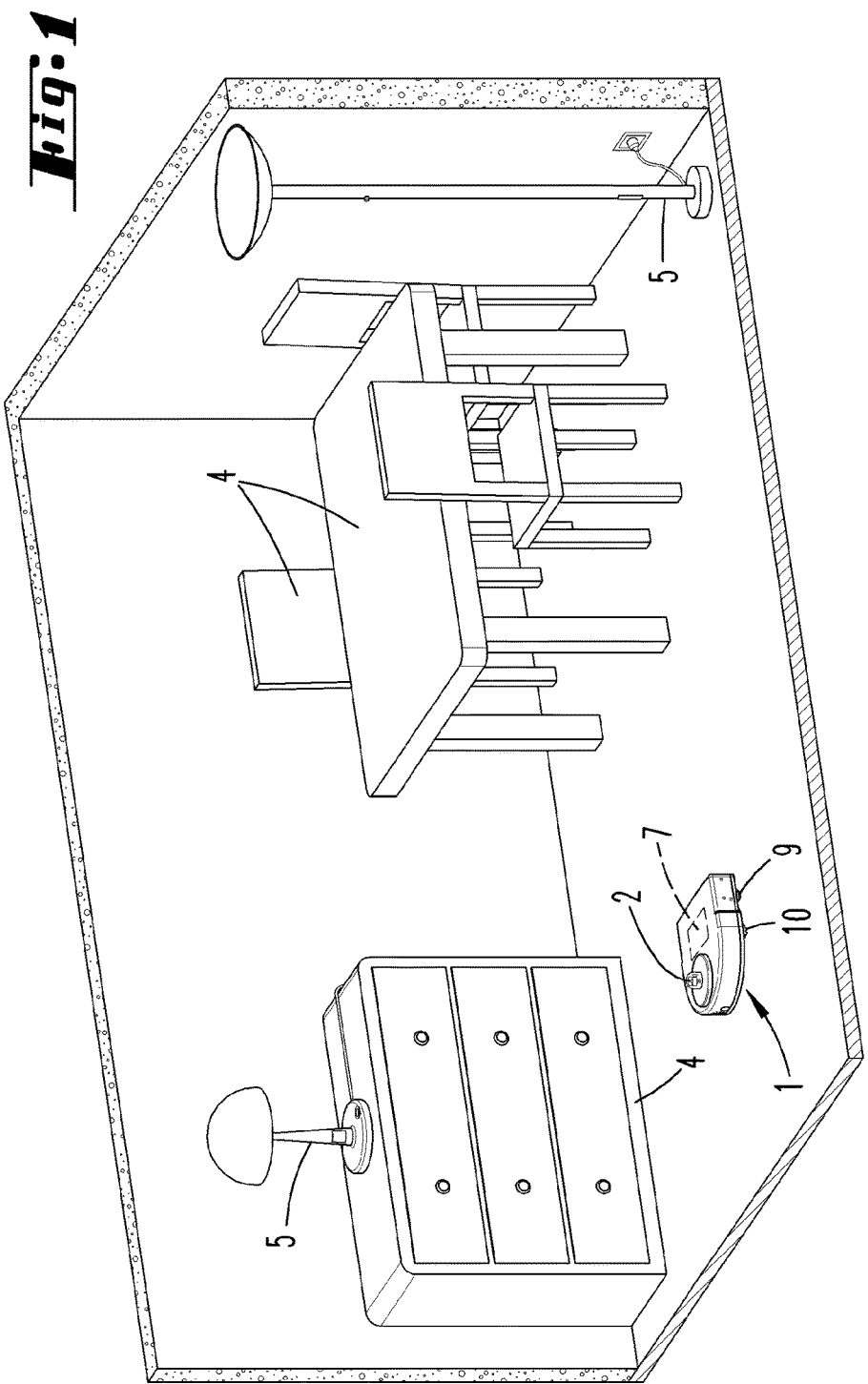

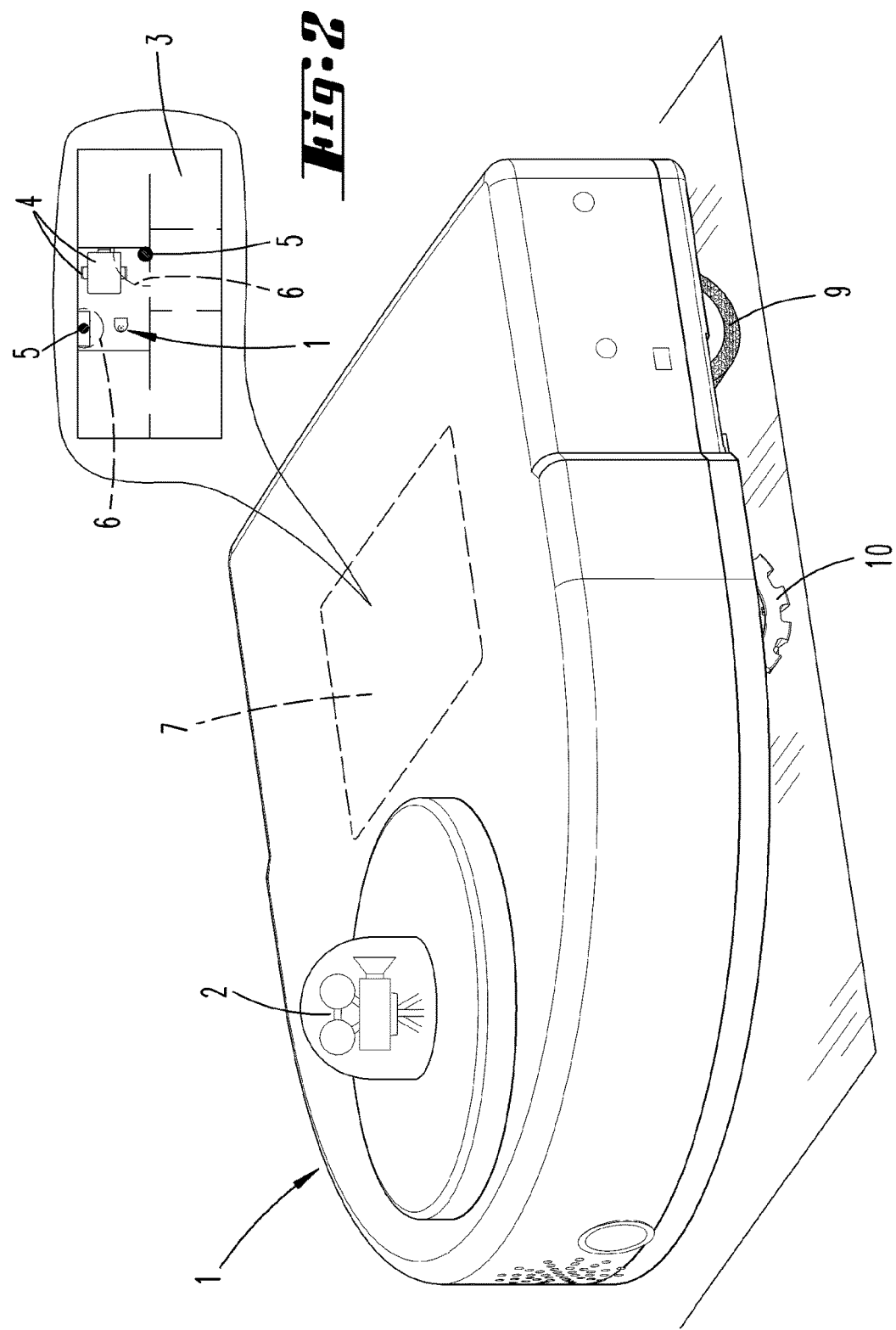

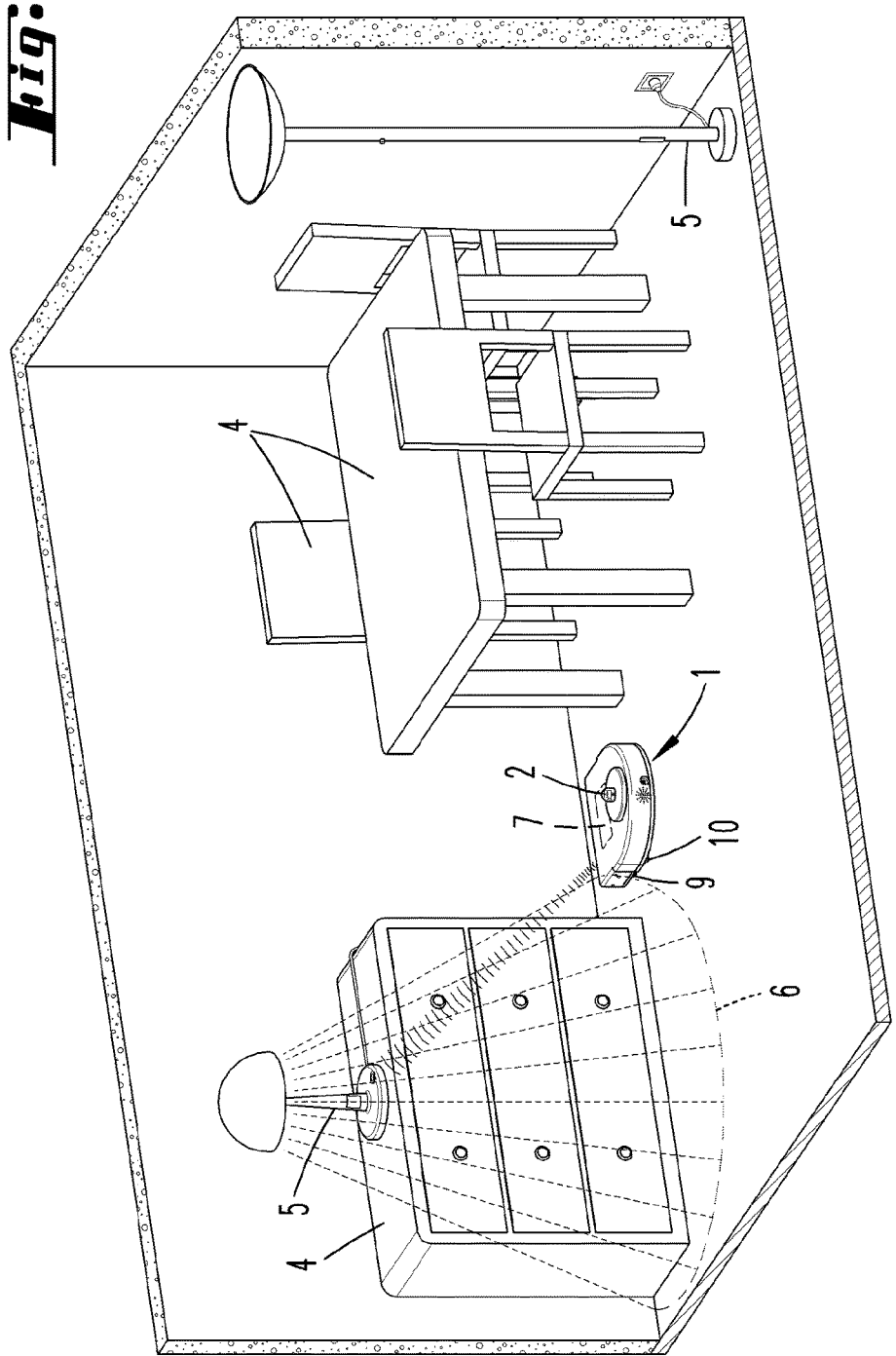

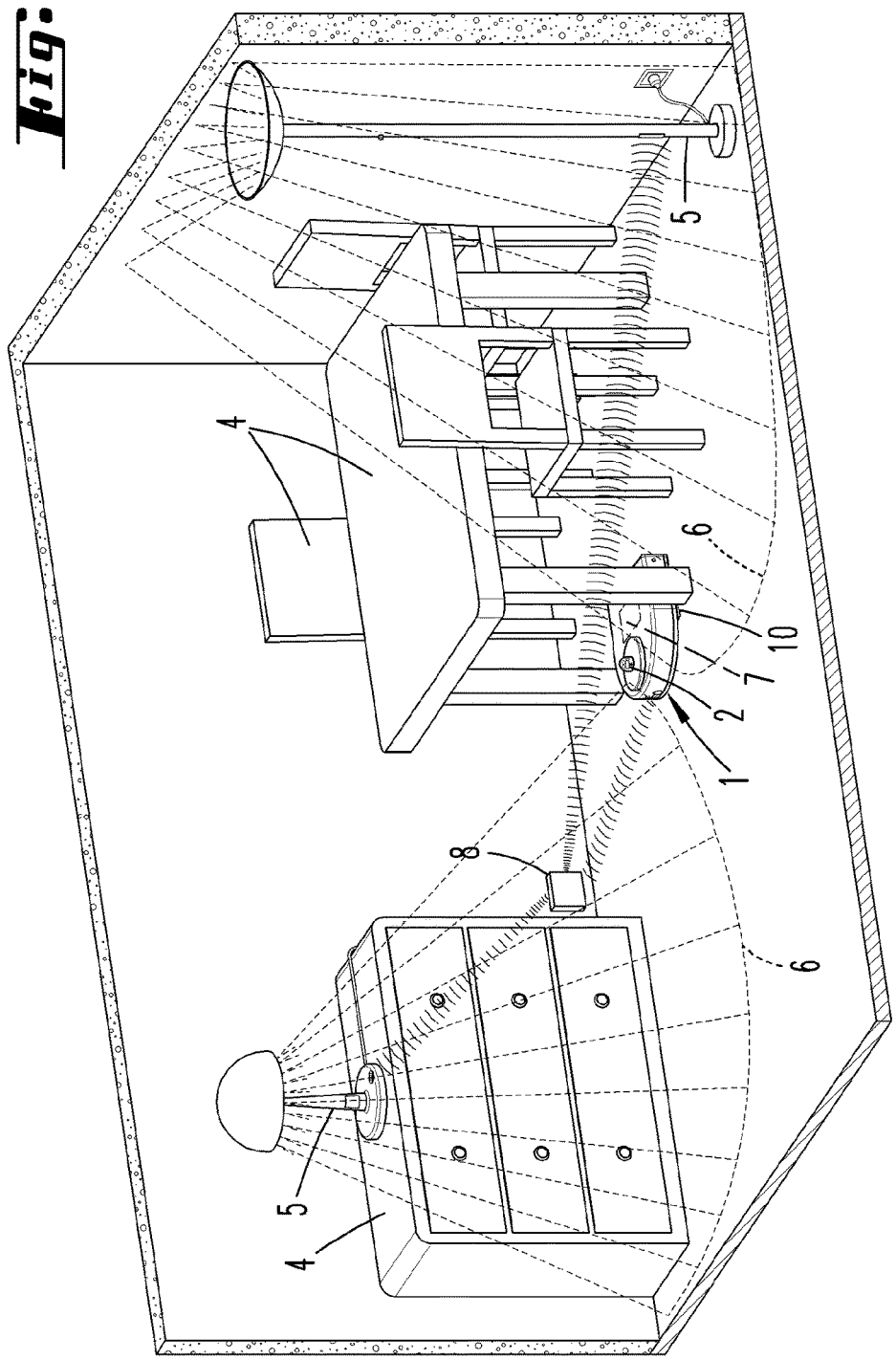

VEHICLE THAT MOVES AUTOMATICALLY WITHIN AN ENVIRONMENT AS WELL AS A SYSTEM WITH A VEHICLE AND AN EXTERNAL ILLUMINATING DEVICE

CROSS REFERENCE TO RELATED APPLICATIONS

Applicant claims priority under 35 U.S.C. § 119 of German Application No. 10 2017 112 793.3 filed Jun. 9, 2017, the disclosure of which is incorporated by reference.

BACKGROUND OF THE INVENTION

1. Field of the Invention

The invention relates to an unmanned vehicle that moves automatically within an environment, in particular a cleaning robot, with a detection system for detecting object data in an environment of the vehicle and a calculating means for generating an area map based on recorded object data, wherein the area map has positions of objects located within the environment.

The invention further relates to a system comprised of at least one unmanned vehicle that moves automatically within an environment, with a detection system for detecting object data in an environment of the vehicle and a calculating means for generating an area map based on recorded object data, at least one external illuminating device designed separately from the vehicle, and a controller for transmitting a control command to the illuminating device.

The invention further relates to a method for operating an unmanned vehicle that moves automatically within an environment and/or a system comprised of such a vehicle, an illuminating device and a controller, wherein a detection system of the vehicle records object data in an environment of the vehicle and a calculating means generates an area map based on recorded object data.

2. Description of the Related Art

Unmanned vehicles moving automatically within an environment are known in prior art. For example, these can be designed as autonomous floor processing devices, in particular as cleaning robots, mowing robots, grinding and/or polishing robots. The vehicles have a navigation system, with which the vehicle can orient itself within an environment. The navigation system usually contains a detection system, for example a camera and/or distance measuring instrument, which records data in the environment that can be processed into an area map, by means of which the vehicle can self-localize and navigate.

Depending on the type of detection system, in particular in conjunction with optical detection systems, it can be advantageous to improve the lighting status within a partial area of an environment, for example increase the light intensity within this partial area of an environment, so that a picture taken by a camera can be better recognized, or decrease the light intensity so that a beam of light emitted by the detection system or its back reflection can be better detected.

For example, Published Patent Application US 2013/0056032 A1 discloses a cleaning robot with an image acquisition system and integrated lamp, which can be turned on and off either by a user input or automatically depending on a detected lighting intensity of the environment around the robot. It is further disclosed that a user transmits a control command to the cleaning robot via a terminal, which the robot relays to an external lamp so as to turn the latter on or off.

SUMMARY OF THE INVENTION

Proceeding from the aforementioned prior art, the object of the invention is to further develop a vehicle, a system and a method, in particular in such a way that the lighting status in an environment of the vehicle can be changed without any user input.

In order to achieve this object, an unmanned vehicle that moves automatically within an environment is proposed, whose area map has information about a position of an external illuminating device designed separately from the vehicle, as well as one or several items of information about the illuminating device, wherein the information is selected from the following group: Light intensity, emission spectrum, position and size of a partial area of an environment that can be illuminated by the illuminating device, type of illuminating device.

According to the invention, the area map of the vehicle is now supplemented with information relating to an illuminating device in the environment of the vehicle. Aside from the position, one or several additional items of information about this illuminating device are stored, so that the vehicle has all relevant information about the illuminating device, and thus can automatically select those illuminating devices from a group of several that are best suited for a current situation and operating task of the vehicle, for example. Information no longer needs to be kept available on a separate terminal, so as to change the lighting status within a partial area of an environment of the vehicle. For example, a light intensity of an illuminating device can be stored in the area map. The word "stored" does not mean that the light intensity as such absolutely must be written into the area map. Rather, a notation regarding an illuminating device stored in the area map can be stored in a separate file, which has additional information about the illuminating device, here for example a light intensity of the illuminating device. A controller of the vehicle can access this information before generating an operating strategy. The light intensity can be a maximum light intensity of a lamp of the illuminating device or a dimmable light intensity range of the lamp. In addition, it is also possible to store a current light intensity of the illuminating device. For example, the light intensity can be measured by a sensor of the vehicle. The light intensity is not to be understood as limiting in terms of a physical unit, at least not exclusively. For example, this term can here be understood as an electrical power consumption (rated power) of a lamp. The information stored in the area map or linked with the latter about the illuminating device can further have an emission spectrum for the illuminating device or its lamp. The emission spectrum indicates those light frequencies at which the illuminating device or lamp emits light. The emission spectrum can be variable, for example because a variable-color lamp is involved. In this case, information can be stored about which spectral ranges, if necessary which separate frequencies, can be actuated. The emission spectrum information stored in the area map should here always also contain an amplitude indication for the respective light frequency. In addition, information about an illuminating device can also contain an indication as to the position and/or size of a partial area of the environment that can be illuminated by the illuminating device. This information provides a vehicle controller with an indication as to which partial area of the environment the illuminating device can illuminate, in particular in relation to the extension and/or shape of the illuminatable partial area of the environment. Furthermore, it is advantageous in dimmable illuminating devices to also store information about how the position and/or size of the illuminatable partial area of the environment changes as does the light intensity. In addition, the area map can also have information about the type of illuminating device. For example, the type of illuminating device can be a type of lamp, manufacturer type of the illuminating device or lamp and the like. For example, the type of illuminating device can also relate to its shape, e.g., its design as a standing lamp, ceiling spot, table lamp, wall lamp and the like, or the type of lamp, e.g., an LED, a fluorescent tube or a spiral-wound filament. Furthermore, the information can also specify the age of the illuminating device and/or lamp, and indicate whether the emission spectrum of the illuminating device is variable or whether the lighting device is dimmable and/or the like. The information about the illuminating devices can either be detected by sensors of the vehicle itself, entered by a user via an input interface in a memory of the vehicle, or provided by an external database which the vehicle can access. For example, the vehicle can actuate any illuminating device and perform the corresponding intensity measurements, spectral measurements or the like for a process of registering the illuminating devices. These measurements can advantageously be performed while a lamp of the illuminating device is being spectrally changed and/or dimmed.

It is proposed that the vehicle have a controller, which is set up to generate a control command for controlling an external illuminating device. The vehicle is designed in such a way as to influence an illuminating device within its environment. For example, the external illuminating device can be controlled by turning it on and/or off, dimming the light intensity, changing the emission spectrum or the like. In particular, the controller can be set up to generate a control command depending on an operation of the detection system. For example, it can be provided that the controller always transmit control commands to the external illuminating device when the detection system of the vehicle is operational, i.e., when a camera is activated, for example. Furthermore, it can also be provided that the controller generate a control command depending on the lighting status in a detection range of the detection system. In this embodiment, for example, an illuminating device is activated when a defined lighting status is present in a detection range of the detection system. For example, it can be provided that an illuminating device be turned on when a sensor of the detection system recognizes that the lighting status, for example the lighting intensity, is insufficient for optimally recording a camera image. It is always recommended that the external illuminating device be controlled while the vehicle is working within a defined operating mode, for example within the framework of a camera-based and/or camera-assisted navigation, object detection or room surveillance. In particular, a control command can act on the external illuminating device when the lighting status within the detection range of the detection system is unfavorable, thereby making it impossible to reliably use the detection system, for example. In this case, the controller of the vehicle can activate one or more illuminating devices, which are preferably present in the direct vicinity of the vehicle. The vehicle can recognize the nearest illuminating devices based on the information stored in the area map. In addition, it is also possible that an illuminating device basically nearest the vehicle be activated, for example to thereby indicate the activity of the vehicle to the user present in the room. The control commands can preferably be transmitted from the controller of the vehicle to the external illuminating device through wireless data communication. The technology used for data communication could be RFID, NFC, iBeacons, Bluetooth, WLAN or even ZigBee, for example. Technologies with a greater range could be used for illuminating devices positioned a greater distance away from the vehicle, such as ceiling spots, while technologies with a shorter range, e.g., RFID, NFC, iBeacons, are used for illuminating devices which the vehicle can approach to a closer distance.

By way of support, it can be provided that the vehicle have its own, integrated illuminating device, so as to achieve illumination even in those partial areas of the environment where lighting via external illuminating devices is insufficient. To this end, the vehicle could have at least one illuminating device, for example a visible LED or an infrared LED. In principle, the integrated illuminating device of the vehicle can be actuated in the same way as an external illuminating device by a control command of the controller of the vehicle, in particular automatically depending on an operation of the detection system of the vehicle and/or lighting status in the environment, in particular within the detection range of the detection system.

In particular, it is proposed that the controller be set up to generate a control command for turning on an illuminating device when a partial area of the environment that can be illuminated by this illuminating device at least partially overlaps a detection range of the detection system. In particular, it can be provided that the controller generate a control command for turning on an illuminating device depending on a detected lighting status within the detection range. In the more general embodiment disclosed first, it can be provided that the controller of the vehicle access the area map, and based on a current travel path check which illuminating devices lie in or on the travel path, specifically in such a way that a partial area of the environment which the illuminating device can illuminate extends into the detection range of the detection system of the vehicle. The partial area of the environment that can be illuminated by the illuminating device can be a light cone, for example, which is projected by the illuminating device onto a floor surface. Since such a light cone usually has no sharp spatial boundary, such a boundary can be defined where a local light intensity still has 70 percent of the maximum light intensity, for example. Based on the area map, the vehicle checks which illuminatable partial areas of the environment crosses its travel path. If at least one partial overlap exists, the respective illuminating device in this area can be turned on, for example to improve the quality of a camera image of the detection system. If the detection system is not an image acquisition system, but rather a detection system that itself sends out light, for example a reflection measuring system, it can instead be provided that those illuminating devices in the environment whose illuminatable partial areas of the environment overlap the travel path of the vehicle be turned off, dimmed or operated with an emission spectrum that does not correspond to the spectrum of a sensor in the detection system. The control command can especially preferably be generated depending on a lighting status detected within the detection range of the detection system. In this case, a sensor of the vehicle, for example a sensor of the detection system, measures which lighting status the detection range it acquired currently has. For example, if it is determined that the lighting status involves too bright, too dark or too irregular an illumination, one or several of the aforementioned measures can be implemented.

It is further proposed that the vehicle have a communication module, in particular a WLAN module, for communicating with an external illuminating device and/or a central controller of a home automation network. The communication module allows the vehicle or its controller to either communicate directly with the respective illuminating device or initially transmit a control command to a central controller of a home automation network, which then either relays the control command to the illuminating device unchanged, or itself generates, modifies or supplements its own control command. The vehicle can use the communication module to transmit control commands on the one hand, but also to receive information from an illuminating device or the central controller. Depending on the required range of the communication partners, communication modules other than a WLAN module can also be used, for example RFID modules, NFC modules and others.

Also proposed apart from the vehicle above is a system comprised of an unmanned vehicle that moves automatically within an environment, with a detection system for detecting object data in an environment of the vehicle and a calculating means for generating an area map based on recorded object data, at least one external illuminating device designed separately from the vehicle and a controller for transmitting a control command to the illuminating device, wherein the area map has information about the position of an illuminating device as well as one or more items of information about the illuminating device, wherein the information is selected from the following group: light intensity, emission spectrum position and/or size of a partial area of the environment that can be illuminated by the illuminating device, type of illuminating device. According to the invention, the system consists of a vehicle, an illuminating device designed externally to the vehicle, and a controller, which generates and transmits control commands for controlling the external illuminating device. The system can have a plurality of illuminating devices, which are distributed within the environment. In addition, several vehicles can be used within the system. The vehicle once again has an area map, which contains information about one or several illuminating devices of the system. The information here involves a position of the respective illuminating device along with another item of information from the aforementioned group, which specifies the properties of the illuminating device in more detail. The area map of the vehicle can be stored either in the vehicle itself or also in an external memory, for example on a webserver, which can be accessed by the controller and possibly also the illuminating devices themselves. The area map can advantageously be generated by a separate device of the vehicle by having the vehicle travel around the environment during a learning run and record the object data, to also include in particular the locations of the illuminating devices within the environment. The area map preferably also has the current location of the vehicle or the additional vehicles present within the system. Information about the illuminating devices stored in the area map or linked with the area map at a separate memory location were previously already explained in more detail above in relation to the vehicle according to the invention. The same also holds true for the system according to the invention.

It is further proposed that the controller be a central controller, which has a communications link to the vehicle and a communications link to the illuminating device. In particular, the controller can be a controller of a home automation network. In this embodiment, the illuminating device is now no longer directly controlled by a controller of the vehicle, but rather via a central controller of the system, which has a communications link with one or several vehicles and one or several illuminating devices. The components of the system, specifically the vehicles and illuminating devices, can be integrated into a WLAN home network, for example, in which the central controller forms an access point. The illuminating devices can preferably be connected with a conventional home power supply system via controllable adapters. As an alternative, however, the illuminating devices can also be controlled directly within a fuse box in the household or via local control modules within the illuminating devices. For purposes of central control, the vehicle could be connected with a central controller of a home automation center, for example, in which all switchable illuminating devices are registered and can be controlled via the latter. Information of the home automation center is integrated in the area map or linked with the latter. Both locations and other information about the respective illuminating device can be stored in the area map, which is accessed by the central controller. As a result, all information is available to the vehicle connected with the central controller. Communication between the vehicles or illuminating devices and the central controller preferably takes place via wireless communication, for example WLAN, and alternatively also by way of a wired connection, for example PowerLAN. For example, wired communication can be advantageous between the central controller and a base station, with which the vehicle connects to charge the battery. The individual illuminating devices are actuated via the central controller, which then serves as a gateway to the individual illuminating devices. If different communication protocols between system participants are used, the central communicator can additionally carry out a conversion of the communication protocols.

It is proposed that the controller be set up to generate a control command for controlling an external lighting device and transmit it to the illuminating device and/or receive it from the vehicle and transmit it to the illuminating device. In the first mentioned alternative, the control command for the illuminating device is generated either by means of a local controller of a vehicle or by means of the central controller of the system. This control command can then either be directly transmitted from the local controller of the vehicle to the respective illuminating device, or in the event the control command was generated by the central controller, centrally from the controller to the illuminating device. In the second mentioned alternative, the control command can be generated by a local controller of a vehicle and transmitted to the central controller, which then only transmits or relays the control command to the illuminating device. The central controller can here relay the control command to the illuminating device unchanged or also introduce a modification and/or addition. It is also conceivable that a communication protocol be converted, as explained above.

It is further proposed that the controller be set up to control an illuminating device when a partial area of an environment that can be illuminated by this illuminating device at least partially overlaps a detection range of the detection system of the vehicle. In particular, it can be provided that the controller be set up to turn on the illuminating device depending on a detected lighting status within the detection range. The control command can basically have an instruction to turn on, turn off, dim, vary an emission spectrum or the like. In particular, it is proposed that an illuminating device be turned on to allow a detection system designed as an image acquisition device to record a high-quality image. However, in particular if the detection system itself emits light for a reflection measurement, for example, it can alternatively be provided that one or several illuminating devices be turned off to reduce the intensity of ambient light, since a deterioration in the measurement result of the detection system could otherwise result. It is proposed that only those illuminating devices be operated that are currently located in or on a travel path of the vehicle in such a way that the detection range of the detection system at least partially overlaps with a partial area of the environment that can be illuminated by an illuminating device. Illuminating devices lying farther away from the travel path of the vehicle are usually not operated, since these usually cannot influence the detection quality of the detection system.

It is proposed that the controller be set up to register vehicles and/or illuminating devices to the system and receive information about a position, a light intensity, an emission spectrum, a position and/or size of a partial area of the environment that can be illuminated by the illuminating device and/or a type of illuminating device. The vehicle can be used to register the illuminating devices to the system. The vehicle can specifically actuate any illuminating device. The illuminating devices are preferably turned on during registration, so that a detection system of the vehicle can use suitable sensors to measure the light intensity, an emission spectrum, a position and/or size of the illuminating device, a partial area of the environment that can be illuminated by the illuminating device, and potentially other parameters. A spatial measurement is preferably performed, in which one or several sensors of the vehicle rotate by 360 degrees, thereby enabling an all-around measurement. It is also possible that the vehicle stand in the middle of a room and there perform a 360 degree measurement. If an illuminating device has a variable emission spectrum, it is recommended that the emission spectrum be specifically varied during registration, so that a spectral sensor of the vehicle can measure the emission spectrum. In dimmable lighting devices, the dimmable light intensity range can likewise be detected and registered. This makes it possible to more easily and quickly identify the individual lighting devices. In addition, it is possible that the vehicles and/or illuminating devices transmit a parameter file to the central controller of the system when initially setting up the system, so that the corresponding parameters can be stored in a central memory of the system. Alternatively or additionally, it is also possible that a system user transmit such information to the system via an operating device of the vehicle and/or an illuminating device.

Finally, the invention also proposes a method for operating an unmanned vehicle that moves automatically within an environment and/or a system comprised of such a vehicle, an illuminating device and a controller, wherein a detection system of the vehicle records object data in an environment of the vehicle and a calculating means generates an area map based on recorded object data, wherein the vehicle detects an illuminating device within the environment and records information about the position of the illuminating device as well as one or several additional items of information about the illuminating device, wherein the information is selected from the following group: Light intensity, emission spectrum, position and/or size of a partial area of an environment that can be illuminated by the illuminating device, type of illuminating device. The area map can preferably be generated by a separate calculating means of the vehicle and stored in a local memory of the vehicle. If the vehicle is a component of a system described above with at least one vehicle and at least one illuminating device, the area map can also be generated and stored in a central device of the system, preferably a central controller of the system. The object data recorded by the detection system of the vehicle are supplemented with additional information, which relates to one or more illuminating devices within the environment of the vehicle. This information was already described above in relation to the vehicle according to the invention or system according to the invention.

It is proposed that an illuminating device be turned on when a partial area of the environment that can be illuminated by this illuminating device at least partially overlaps a detection range of the detection system of the vehicle, in particular that the illuminating device be turned on depending on a detected lighting status within the detection range.

It can further also be provided that a controller of the vehicle generate a control command for controlling an external illuminating device and transmit it to the illuminating device. Alternatively, it can be provided that a central controller of the system generate a control command and transmit it to the illuminating device, or receive a control command from the vehicle and transmit it to the illuminating device.

The features and advantages of the method are as described in more detail above in relation to the vehicle according to the invention or system according to the invention. The corresponding features and advantages thus also apply as disclosed in relation to the method.

BRIEF DESCRIPTION OF THE DRAWINGS

The invention will be described in more detail below based on exemplary embodiments. Shown on:

FIG. 1 is a system comprised of a vehicle and two illuminating devices;

FIG. 2 is the vehicle according to FIG. 1;

FIG. 3 is the system according to FIG. 1 during an operation;

FIG. 4 is a system comprised of a vehicle, two illuminating devices and an external controller during an operation.

DETAILED DESCRIPTION OF THE PREFERRED EMBODIMENTS

FIG. 1 shows a room in a home, in which a vehicle 1, here specifically an autonomous cleaning robot, is traveling. A plurality of objects 4 are arranged in the room, here specifically items of furniture, such as a table, several chairs and a chest of drawers. Also located in the room are two illuminating devices 5, specifically one standing lamp designed as a ceiling spot, and a table lamp located on the chest of drawers.

The vehicle 1 has electric motor-driven wheels 10 for automatically moving the vehicle 1, as well as a cleaning element 9, which is here designed as a rotating cylinder, for example. The vehicle 1 can basically be any kind of autonomous vehicle. Mentioned here only as examples are vacuuming robots, wiping robots, polishing robots, grinding robots or the like. The vehicle 1 has an integrated controller 7, which can generate control commands for the vehicle 1, in particular travel commands for navigating the vehicle 1 through the room while avoiding collisions with the objects 4. For example, the controller 7 is here a processor of the vehicle 1, which also serves to generate an area map 3 for the vehicle, and is linked with a data memory for storing the area map 3. The vehicle 1 further has a detection system 2 for detecting objects 4 within the environment of the vehicle 1. For example, the detection system 2 here has an image acquisition device, specifically a camera. The latter can be rotated by 360 degrees or have a lens that enables a panoramic view around the vehicle 1, for example a fisheye lens. In addition, the vehicle 1 has a communication system (not shown), here a WLAN module, which the vehicle 1 can use to communicate with other WLAN modules. Alternatively, other communication modules can also be used, of course, for example Bluetooth modules or others.

The vehicle 1 has a navigation system, which the vehicle 1 can use to orient itself within the environment. The navigation system here consists of the detection system 2 and, for example, an odometer system allocated to the wheels 10 of the vehicle 1, which records a distance traveled by the vehicle 1. The area map 3 can be generated from the data of the detection system 2 and odometer system. In the usual manner, the area map 3 contains the detected objects 4 and illuminating devices 5, which are also objects 4. Apart from the spatial position of an illuminating device 5, the area map 3 can also have additional information about the illuminating device 5, specifically an indication as to the type of illuminating device 5 and/or its light intensity and/or its emission spectrum and/or a position and/or size of a partial area of the environment 6 that can be illuminated by the illuminating device 5 and/or information about the type of illuminating device 5. For example, this information can be manually entered by a user via an input interface (not shown) and/or transferred from the respective illuminating device 5 to the vehicle 1 via a communication module. Alternatively, however, it is also possible that the vehicle 1 itself detect corresponding information during a learning run. To this end, for example, the vehicle 1 can have an intensity sensor and/or spectral sensor, which measures a light intensity of an illuminating device 5, potentially its emission spectrum and/or a position and/or size of a partial area of the environment 6 illuminated by the illuminating device 5. The illuminating devices 5 are advantageously turned on during the learning run, so that the vehicle 1 can perform the corresponding measurements. If the illuminating device 5 is a dimmable illuminating device 5 in terms of light intensity or an illuminating device 5 with a variable emission spectrum, it is recommended that the emission characteristics of the illuminating device 5 be varied while the vehicle 1 performs a corresponding measurement. In this way, comprehensive information about each individual illuminating device 5 can be detected and stored.

FIG. 2 shows a magnified view of the vehicle 1. An area map 3 is stored in a data memory of the controller 7. Among other things, this area map 3 contains a floor plan of the room depicted on FIG. 1. The area map 3 contains the positions of the detected objects 4 along with the positions of the detected illuminating devices 5. Also shown in relation to the two illuminating devices 5 are a respective position and size of a partial area of the environment 6 illuminated by the illuminating device 5. The partial area of the environment 6 is sketched in with a respective dashed perimeter. The sketched line here does not indicate an actual demarcation of the illuminated partial area of the environment 6, but rather a mathematical boundary within which the light intensity here measures roughly 70 percent of the maximum light intensity, for example. Since the illuminating devices 5 shown here are ones with a conical emission characteristic, the projections of the partial areas of the environment 6 onto the floor surface of the room are essentially circular. In relation to the illuminating device 5 designed as a ceiling spot, the partial area of the environment 6 sketched in the area map 3 is a partial area of the environment 6 of the floor surface being hit by the radiation reflected back from the illuminated ceiling.

FIG. 3 shows a situation in which the vehicle 1 travels within the room in order to perform a cleaning task there. For purposes of collision-free movement, the vehicle 1 orients itself to the area map 3. The detection system 2 here continuously records images of the environment, so as to continue the area map 3 and localize the current position of the vehicle 1 within the environment. There now exist areas within the room that are not illuminated by daylight enough to ensure an optimal quality of the recorded images, for example. As a result, it may not be possible to reliably detect or localize the outlines of objects 4, accumulations of coarse dirt or the like. Therefore, it is necessary to additionally illuminate the immediate surroundings of the vehicle 1 with one or several of the illuminating devices. In the example shown, the vehicle 1 is located next to the object 4 designed as a chest of drawers. For example, if a window in the room is located on the side of the object 4 opposite the vehicle 1, a shadow arises behind the object 4 that reduces the quality of the image recorded by the detection system 2 of the vehicle 1. The detection system 2 recognizes that the recorded images are not optimally illuminated, and transmits information about this to the controller 7 of the vehicle 1. The controller 7 thereupon checks the area map 3 to determine which illuminating devices 5 are available in the area of the room currently being traversed. The controller 7 here recognizes that the detection range of the detection system 2 extends into a partial area of the environment 6 that can be illuminated by the illuminating device 5 designed as a table lamp. The controller 7 then generates a control command for turning on the illuminating device 5. For example, the control command is here transmitted via a WLAN communication module. The detection system 2 can now record high-quality images within the partial area of the environment 6. Once the vehicle 1 has again left this partial area of the environment 6, the controller 7 of the vehicle 1 transmits a control command for turning off the illuminating device 5 to the illuminating device 5. If the vehicle 1 once again makes its way into an area of a room that is insufficiently illuminated as it continues traveling through the room or home, another check can be performed based on the area map 3 to determine which illuminating device 5 is suitable for illuminating a specific partial area of the environment 6. It can basically also be provided that an illuminating device 5 present in the travel path of the vehicle 1 always be turned on. As explained previously, however, it is alternatively also possible that the illuminating device 5 only be turned on when needed. It can further be provided that an illuminating device 5 be turned off as the vehicle 1 approaches the corresponding partial area of the environment 6. This can be advantageous if the detection system 2 of the vehicle 1 itself emits light, for example to measure a back reflection. In this case, it would be disadvantageous to additionally illuminate the environment with an illuminating device 5. In addition, it is also conceivable that the controller 7 of the vehicle 1 control the illuminating device 5 in relation to other parameters, for example in relation to its dimmable light intensity, a variable emission spectrum and/or a position and/or size of an illuminated partial area of the environment 6.

FIG. 4 shows a system consisting of a vehicle 1 automatically moving within the room, two illuminating devices 5 and a central controller 8. The system is here part of a home automation system, wherein communication between the vehicle 1 and illuminating devices 5 takes place via the central controller 8. The central controller 8 can be an access point of a WLAN home network. For example, in this embodiment of the invention, the vehicle 1 again travels within the room depicted and records images by means of the detection system 2. If the vehicle 1 gets into a partial area of the room only inadequately illuminated for optimally operating the detection system 2, the vehicle 1 sends a corresponding message to the central controller 8. The central controller 8 access an advantageously centrally stored area map 3 and checks which illuminating device 5 is located near the travel path of the vehicle 1. In particular, a check is performed to see whether a partial area of the environment 6 that can be illuminated by an illuminating device 5 extends into the travel path. In the example shown, both illuminating devices 5 are suitable for at least partially illuminating the current position of the vehicle 1. For this reason, the central controller 8 transmits a control command to each of the illuminating devices 5, whereupon the latter are turned on.

Embodiments in which an illuminating device 5 has a lamp with an emission spectrum in the infrared spectral range would also be possible, for example. The controller 7, 8 could specifically actuate this illuminating device 5, so that objects 4 can be better recognized, for example based on an optimized color differentiation. Infrared illumination could further also be advantageous in otherwise dark environments, for example so as not to disturb any people present. A recording rate for the detection system 2 can advantageously be selected in such a way as to exceed a variation rate of an emission spectrum of the illuminating device 5. In particular, it can be provided that the detection device 2 be synchronized with the illuminating device 5 in this regard. This can also help improve the recognition of objects 4.

In relation to all mentioned examples, it is of course also possible that the vehicle 1 itself have an integrated illuminating device 5, so as to support illumination at locations in the room where illumination by the external illuminating devices 5 is inadequate. For example, to this end, the vehicle 1 could have an illuminating device 5 that emits in an infrared spectral range or a visible spectral range.

REFERENCE LIST

1 Vehicle
2 Detection system
3 Area map
4 Objects
5 Illuminating device
6 Partial area of the environment
7 Controller
8 Controller
9 Cleaning element
10 Wheel

What is claimed is:

1. An unmanned vehicle that moves automatically within an environment comprising:
   a detection system configured for detecting object data in an environment of the vehicle;
   a calculating device for generating an area map based on the detected object data, and
   a controller, which is configured to generate a control command depending on an operation of the detection system and/or a lighting status in a detection range of the detection system
   wherein the area map has positions of objects located within the environment, wherein the area map has information about a position of an external illuminating device designed separately from the vehicle, as well as one or several items of information about the illuminating device,
   wherein the information is selected from the group consisting of: light intensity, emission spectrum, position of a partial area of an environment that can be illuminated by the illuminating device, and size of a partial area of an environment that can be illuminated by the illuminating device,
   wherein the controller is configured to generate a control command that turns on the illuminating device if a partial area of the environment that can be illuminated by this illuminating device at least partially overlaps a detection range of the detection system.

2. The vehicle according to claim 1, wherein the vehicle has a communication module for communicating with an external illuminating device and/or a central controller of a home automation network.

3. A system comprised of at least one unmanned vehicle that moves automatically within an environment, comprising:
   a detection system for detecting object data in an environment of the vehicle;
   a calculating device for generating an area map based on recorded object data,
   at least one external illuminating device designed separately from the vehicle, and
   a controller configured for transmitting a control command to the illuminating device to turn on the lighting device,
   wherein the area map has positions of objects located within the environment,
   wherein the area map has information about the position of the illuminating device as well as one or more items of information about the illuminating device, and
   wherein the information is selected from the group consisting of: light intensity, emission spectrum, position of a partial area of an environment that can be illuminated by the illuminating device, and size of a partial area of an environment that can be illuminated by the illuminating device.

4. The system according to claim 3, wherein the controller, is disposed remote from the vehicle and has a communications link to the vehicle and a communications link to the illuminating device.

5. The system according to claim 3, wherein the controller is set up to generate a control command for controlling the external lighting device and transmit the control command to the illuminating device and/or receive the control command from the vehicle and transmit it to the illuminating device.

6. The system according to claim 3, wherein the controller is configured to control the illuminating device when a partial area of an environment that can be illuminated by the illuminating device at least partially overlaps a detection range of the detection system of the vehicle, to turn on the illuminating device depending on a detected lighting status within the detection range.

7. The system according to claim 3, wherein the controller is set up to register vehicles and/or illuminating devices to the system and receive information about a position, a light intensity, an emission spectrum, a position and/or size of a partial area of the environment that can be illuminated by the illuminating device and/or a type of illuminating device.

8. A method for operating an unmanned vehicle that moves automatically within an environment, comprising:

detecting with a detection system of the vehicle an illuminating device within the environment, recording with the detection system of the vehicle information about a position of the illuminating device as well as at least one additional item of information about the illuminating device, and generating with a calculating device of the vehicle an area map based on recorded object data, and turning on an illuminating device when a partial area of the environment that can be illuminated by this illuminating device at least partially overlaps a detection range of the detection system of the vehicle, such that the illuminating device is turned on depending on a detected lighting status within the detection range, wherein the information is selected from the group consisting of: light intensity, emission spectrum, position of a partial area of an environment that can be illuminated by the illuminating device, and size of a partial area of an environment that can be illuminated by the illuminating device.

9. The method according to claim 8, further comprising the step of generating a control command with a controller of the vehicle for controlling an external illuminating device and transmitting the control command to the illuminating device, or generating a control command with a controller of the system that is disposed remote from the vehicle and transmitting the control command to the illuminating device, or receiving a control command from the vehicle and transmitting the control command to the illuminating device.

* * * * *